D. A. YORK.
CUSHION TIRE.
APPLICATION FILED OCT. 5, 1911.
1,032,977.
Patented July 16, 1912.
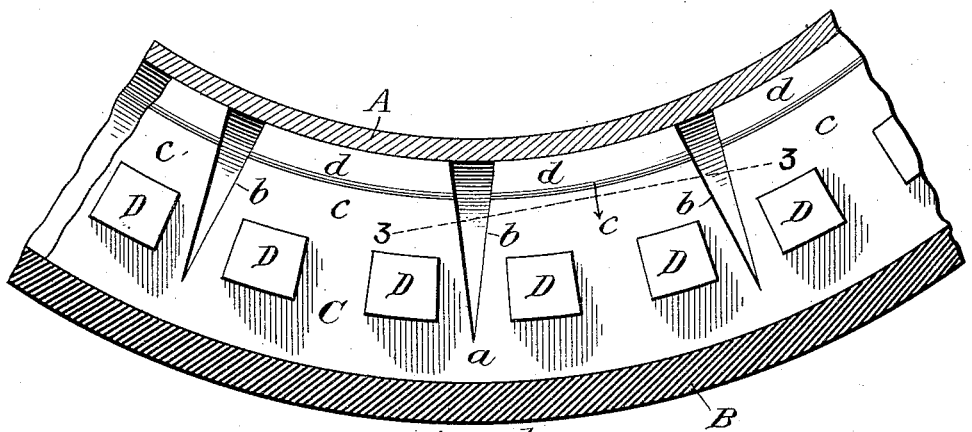
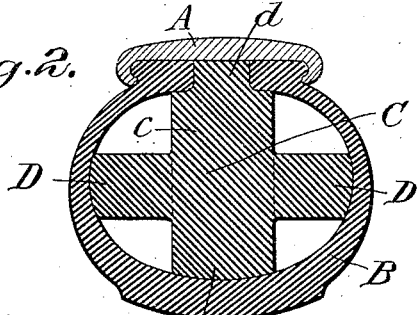
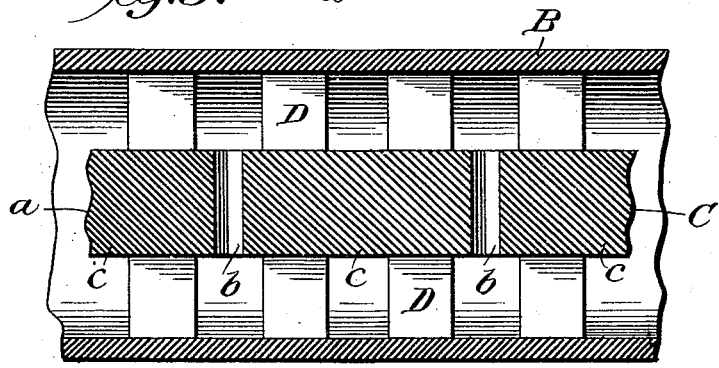
WITNESSES.
Philip E. Barnes
Edna J. Sheehy
INVENTOR,
David A. York,
BY
James Sheehy & Co.
ATTYS

UNITED STATES PATENT OFFICE.

DAVID A. YORK, OF NORTH GROVE, INDIANA, ASSIGNOR OF ONE-HALF TO WILLIAM H. YORK, OF ASHLEY, INDIANA.

CUSHION-TIRE.

1,032,977.

Specification of Letters Patent. Patented July 16, 1912.

Application filed October 5, 1911. Serial No. 652,907.

*To all whom it may concern:*

Be it known that I, DAVID A. YORK, citizen of the United States, residing at North Grove, in the county of Miami and State of Indiana, have invented new and useful Improvements in Cushion-Tires, of which the following is a specification.

My present invention pertains to cushion tires, and more particularly to those designed for use on automobile wheels.

The object of the said invention is to provide a tire which, by virtue of the peculiar construction of its resilient core, is light in weight, not liable to be affected by puncture, durable, and calculated to efficiently cushion a wheel of a heavy vehicle such as an automobile. The tire in smaller sizes is also designed for use on bicycle wheels, motorcycle wheels, and the wheels of various horse-drawn vehicles.

With the foregoing in mind, the invention will be fully understood from the following description and claim when the same is read in connection with the drawings, accompanying and forming part of this specification, in which:

Figure 1 is a longitudinal section of a tire constructed in accordance with my invention, and properly arranged relative to a wheel rim. Fig. 2 is a transverse section showing the core, the wheel rim and the tire casing in section. Fig. 3 is a detail section taken on the line 3—3 of Fig. 1 and showing the pairs of lateral stays at the opposite sides of each section of the core.

Similar letters designate corresponding parts in all of the views of the drawings, referring to which:

A is a wheel rim which may be of the type illustrated or of any other design and construction consonant with the purpose of my invention, and B is the casing of my novel tire. The said casing may be of the material generally employed for tire casings, and may be engaged with and held by the rim in the manner shown.

My invention resides chiefly in the core C of the tire, which core is preferably of rubber or of a composition containing rubber, though it may be of any other resilient material or composition adapted for the use to which it is put without departure from the scope of my claimed invention.

As will be readily understood by comparison of Figs. 1–3, the core C comprises a longitudinal-central bar $a$ the inner portion—*i. e.*, the portion adjacent the rim A, of which is divided by kerfs $b$ into sections $c$, and lateral stays D, preferably two at each side of each section $c$. The kerfs $b$ are diminished in width outward or in a direction away from the center of the wheel, as shown, this in order to permit of sufficient movement of the sections $c$ with respect to each other when the tire is compressed, without rendering the outer portion of the core unduly flexible or weak. The function of the lateral stays D is to give shape to the tire as a whole and to prevent transverse turning of the bar $a$ within the casing B; attention here being directed to the fact that the outer edge of the core bar $a$ bears against the inner side of the tread portion of casing B, while the inner reduced edges $d$ of the sections $c$, comprised in the core bar, are interposed and held against transverse movement by the edges of the casing, Fig. 1, throughout the width of the said edges. It will also be noted that the inner reduced edges $d$ of the sections $c$ bear against the outer side of the rim A, and hence serve to efficiently cushion the edge portions of the casing and retain said edge portions in engagement with the edge portions of the rim.

While the stays D serve the purpose stated, it will be observed that by reason of the spaces afforded between the stays and the sides of the core bar, the said stays do not detract in any measure from the resiliency. The spaces referred to are also materially advantageous because the provision thereof tends to lessen the weight of the core bar and the tire as a whole.

Having described my invention, what I claim and desire to secure by Letters-Patent, is:

In combination with a rim having flanges, a casing having bead portions arranged within said flanges and bearing against the rim, and a resilient core contained in the casing and having a longitudinal-central bar, and spaced kerfs, diminished in width outward, extending radially outward from the inner edge of said bar to points adjacent the outer edge thereof and dividing the inner portion of said bar partially into sections, and also having lateral stays at opposite sides of each of the said sections; the inner edges of the said core sections being reduced in thickness and arranged throughout their lengths against the rim and between the bead portions of the casing throughout the width of said bead portions, and the shoulders at the outer ends of the said reduced edges of the core sections being arranged against the opposite sides of the bead portions of the casing to confine said bead portions against the rim.

In testimony whereof I have hereunto set my hand in presence of two subscribing witnesses.

DAVID A. YORK.

Witnesses:
 OSCAR L. GRAVES,
 HAZEL McDOWELL.

Copies of this patent may be obtained for five cents each, by addressing the "Commissioner of Patents, Washington, D. C."